United States Patent [19]

Larson

[11] Patent Number: 5,632,857
[45] Date of Patent: May 27, 1997

[54] PROCESS FOR REMOVING WATERBORNE FLEXOGRAPHIC INKS FROM SUBSTRATES

[75] Inventor: Eric H. Larson, Freehold, N.J.

[73] Assignee: Rhone-Poulenc Inc., Princeton, N.J.

[21] Appl. No.: 416,417

[22] Filed: Apr. 4, 1995

[51] Int. Cl.$^6$ ............................................. D21C 5/02
[52] U.S. Cl. ................................ 162/5; 162/4; 210/704
[58] Field of Search ......................... 162/5, DIG. 3, 162/4; 210/704, 705, 725, 727, 728, 928, 776, 806

[56] References Cited

U.S. PATENT DOCUMENTS

| | | | |
|---|---|---|---|
| 4,043,908 | 8/1977 | Roberts et al. | 162/5 |
| 4,347,099 | 8/1982 | Deceuster et al. | 162/5 |
| 4,599,190 | 7/1986 | Maloney | 252/174.24 |
| 5,094,716 | 3/1992 | Letscher | 162/7 |
| 5,288,369 | 2/1994 | Ishibashi et al. | 162/5 |
| 5,384,010 | 1/1995 | Hou et al. | 210/704 |
| 5,417,807 | 5/1995 | Fossas et al. | 162/5 |
| 5,454,955 | 10/1995 | Albrecht et al. | 210/728 |

FOREIGN PATENT DOCUMENTS

WO93/21376  10/1993  WIPO.

*Primary Examiner*—Joseph W. Drodge
*Attorney, Agent, or Firm*—Andrew M. Solomon

[57] ABSTRACT

A process for removing water borne flexographic inks from paper stock comprising the steps of (a) forming a slurry by pulping paper containing water borne flexographic inks in an aqueous medium having a pH of greater than 8 which includes: (1) one or more basic agents; (2) one or more nonionic surfactants; (3) one or more anionic polyelectrolytes; and (4) an amount of paper different from that being processed which contains inorganic fillers, coatings or mixtures thereof; and (b) subjecting the slurry produced in step (a) to a flotation cell having an aqueous medium having a pH of greater than 8 which includes: (1) one or more basic agents; (2) one or more nonionic surfactants; and (3) one or more anionic polyelectrolytes is provided.

26 Claims, No Drawings

[5,632,857]

PROCESS FOR REMOVING WATERBORNE FLEXOGRAPHIC INKS FROM SUBSTRATES

BACKGROUND OF THE INVENTION

1. Field of the Invention

The present invention relates to a process for removing waterborne flexographic printing inks from substrates containing them. More particularly, the invention comprises removing waterborne (hydrophilic inks) from a substrate by using pulping and a flotation deinking process wherein the aqueous mediums have a basic pH, and include a nonionic surfactant and an anionic polyelectrolyte and wherein the pulper includes an amount of paper stock, different from the stock being treated, which includes an inorganic filler or coating.

2. Technology Description

Waterborne inks used to print newspapers by flexographic processes offer reduced emissions of volatile organic compounds to the environment during the printing process compared to oil based ink formulations. These inks, however, interfere with the recycling of the same newspapers as the colloidal nature of the pigments used combined with their hydrophilic nature make their separation from paper fiber difficult. The use of these inks can be viewed as an exchange of one type of environmental liability for another.

Waterborne or hydrophilic inks are characterized as having water as the vehicle or major liquid component in which is dissolved or suspended the large number of additives used by the ink formulator to provide a variety of desirable properties required for application on the printing press. These additives may include pigments and dyes (e.g., carbon black), for coloring the printed surface, binders such as dissolved or suspended polymers (e.g., polyacrylate), thickeners to control the rheology of the ink, water miscible solvents such as alcohols to control drying rate, surface tension, settling stability and other properties. In addition surfactants to control a variety of surface properties and control or minimize foaming, and dispersants to maintain product quality in storage and use are common. Buffers and other pH modifiers are commonly used. One common class of waterborne inks contains a carboxylated polymer and a fugitive base such as ammonia hydroxide which is selected to provide a medium that the resin is soluble. The carboxylated polymer is soluble in the aqueous vehicle at high pH; when the ink is applied to paper on the printing press, the base vaporizes reducing the pH. This results in desolubilization of the polymer which improves the attachment of pigment to the substrate.

The impact of using waterborne inks on conventional deinking processes is severe; inclusion of as little as 5% flexographic news into a newsprint recycle furnish can significantly reduce the brightness of the recycled pulp.

Conventional practice has been to process flexographic newsprint using wash deinking processes. While wash deinking is easy to operate, and requires minimal capital investment, the large volumes of water required make wash deinking an increasingly environmentally unacceptable practice. The paper industry as a whole is under severe pressure to reduce rates of water consumption. As a result the trend in the recycled paper industry is towards use of flotation or hybrid flotation/wash systems for ink removal. Flotation is particularly ill-suited for removal of waterborne ink from recycle newsprint as both the small particle size and hydrophilic nature of the ink result in poor rates of bubble attachment and low separation efficiencies. The poor effectiveness of flotation in removal of waterborne inks is a particular obstacle to recycling newsprint so contaminated, and in some cases restricts the acceptance of the use of waterborne inks as a means to reduce emissions of volatile organic compounds.

There have been proposals describing a two stage process to remove waterborne pigments using a flotation step under acidic conditions followed by a flotation step under alkaline conditions. Maintenance of acid conditions limits the hydrophilicity of the pigment particles, and reduces the degree of dispersion of such inks. The benefit of this procedure is avoidance of the high water consumption of a wash system, however the capital and operating costs of this process are greater than that of a single flotation stage process, and in addition pulping under acidic conditions is difficult if the waste paper contains alkaline fillers such as calcium carbonate.

In Borchardt et al (TAPPI 1994 Pulping Conference, November 6–10, Proceedings pages 1067–1103) many of the difficulties of recycling flexographic newsprint are described in detail; in particular the extremely small size and hydrophilic nature of the pigment particles, and difficulty in removing them by either wash or flotation unit operations. Borchardt also discloses polyacrylates as effective in reducing redepositon of pigment in these applications.

In WO 93/21376 use of anionic polymers as aides in deinking wastepaper under substantially neutral conditions is described. This reference stresses that its process cannot be used at a pH of greater than 9 as yellowing of the pulped fibers can occur.

U.S. Pat. No. 5,094,716 describes the use of a combination of an anionic surfactant and an anionic dispersant for use in removal of hydrophobic inks in wash processes. This reference does not suggest the use of its process for treatment of hydrophilic inks or the use of a nonionic surfactant.

U.S. Pat. No. 4,599,190 describes use of polyelectrolyte dispersants in combination with nonionic surfactants in wash deinking of secondary fiber. This process suggested is not a flotation process and it is unclear from the teaching of the reference if it can be used to treat hydrophilic inks.

U.S. Pat. No. 4,347,095 describes the use of carboxylated polymers in the presence of alkaline solutions for reclamation of conventional waste paper. This reference does not suggest that its process can be used to treat hydrophilic flexographic inks; rather, it appears as its teachings solely relate to hydrophobic inks, which have completely different redeposition properties as compared to hydrophilic inks.

Despite the above teachings, there still exists a need in the art for a process for removing hydrophilic inks under alkaline conditions by using a flotation method as such a method provides an environmentally friendly, cost effective way to remove such hydrophilic inks.

BRIEF SUMMARY OF THE INVENTION

In accordance with the present invention a novel process for deinking is provided which reveals a surprising combination of beneficial effects under the conditions of alkaline flotation deinking of newspaper printed with waterborne ink in the presence of nonionic surfactants, anionic polyelectrolytes and recycled coated paper. The novel process provides an environmentally friendly, cost effective way to remove hydrophilic inks from substrate.

One embodiment of the present invention provides A process for removing waterborne flexographic inks from paper stock comprising the steps of:

(a) forming a slurry by pulping paper containing waterborne flexographic inks in an aqueous medium having a pH of greater than 8 which includes:
  (1) one or more basic agents;
  (2) one or more nonionic surfactants;
  (3) one or more anionic polyelectrolytes; and
  (4) an amount of paper different from that being processed which contains inorganic fillers, coatings or mixtures thereof; and (b) subjecting the slurry produced in step (a) to a flotation cell having an aqueous medium having a pH of greater than 8 which includes:
  (1) one or more basic agents;
  (2) one or more nonionic surfactants; and
  (3) one or more anionic polyelectrolytes.

In particularly preferred embodiments, the pH of both steps (a) and (b) are between 8.0 and about 10.5, the nonionic surfactant present in both steps (a) and (b) is an alkoxylated fatty alcohol, the anionic polyelectrolyte present in both steps (a) and (b) is a copolymer of maleic anhydride and isobutylene and the additional paper added in step (a) is coated magazine paper stock.

An object of the present invention is to provide a process which is effective in removing hydrophilic flexographic inks from a substrate which uses flotation processing.

Still another object of the present invention is to provide a process which is effective in removing hydrophilic flexographic inks from a substrate, requires a minimal amount of water for use, and is cost effective.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention provides a novel process for removing waterborne or hydrophilic inks from paper stock while using flotation processing.

The first step of the invention is directed to pulping paper containing waterborne flexographic inks in an aqueous medium having a pH of greater than 8 which includes:
  (1) one or more basic agents;
  (2) one or more nonionic surfactants;
  (3) one or more anionic polyelectrolytes; and
  (4) an amount of paper different from that being processed which contains inorganic fillers, coatings or mixtures thereof.

The paper to be pulped, which also includes by definition any cellulosic sheet materials containing hydrophilic flexographic inks including, for example, newspaper, filled and unfilled papers and paper boards is provided to a pulper at alkaline pH conditions. The ink present on the paper to be pulped comprises waterborne flexographic ink. This type of ink, as discussed above, differs from letterpress and offset ink by having water as the liquid vehicle used to apply the pigment to the substrate. In practice, the water amount of the ink generally ranges from about 50 to about 90 percent by weight of the entire ink, with amounts between about 65 and about 77 percent by weight of the ink being commonly used in industry. Until the present invention, these types of inks have been extremely difficult to effectively remove from a paper substrate as they tend to form small particles during the pulping step which are difficult to disperse into the pulping aqueous medium.

The pH of the aqueous medium of the pulper is maintained between about 8 to about 10.5, more preferably between about 9 to about 10, and most preferably between about 9 to about 9.5. Maintenance of the alkaline pH is accomplished by adding one or more basic agents to the pulper. Agents which may be selected include any of those commonly known in the art which are capable of raising the pH to between 8.0 and about 10.5. Examples of such basic agents include, but are not limited to the following materials: of NaOH, $NH_4OH$, KOH, $Na_2CO_3$, $K_2CO_3$, silicates ($Na_2O$ $(SiO_2)_x$) x=0.4 to 4.0, $Na_3PO_4$, $Na_2HPO_4$ and mixtures thereof. The amount of basic agent added to the pulper is that which is required to obtain the desired pH. This amount can be readily measured by those skilled in the art.

Also present in the aqueous medium of the pulper is one or more nonionic surfactants. The surfactants function to disperse the ink into the aqueous medium during pulping. Nonionic surfactants suitable for use are higher (greater than $C_8$) aliphatic alcohol alkoxylates, aliphatic acid alkoxylates, higher aromatic alcohol alkoxylates, fatty acid amides of alkanolamines, fatty acid amide alkoxylates, propylene glycol alkoxylates, block or random copolymers of ethylene and propylene oxide, higher (greater than $C_8$) alcohol polyethylene polypropylene block or random adducts and mixtures thereof. Specific examples of surfactants which may be used in accordance with the present invention include the following classes of chemicals:

1) a fatty alcohol having a carbon number of from about 8 to about 22, alkoxylated with ethylene oxide and propylene oxide, as represented by formula (I)

$$R—O—(CH_2CH_2O)_x—(CH_2CH(CH_3)—O)_y—Z \qquad (I);$$

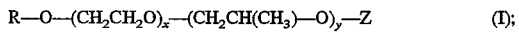

wherein R is a straight-chain or branched alkyl group having a carbon number of from about 8 to 22; Z is H or Cl; x represents the number of oxyethylene groups per molecule and is in the range of from about 3 to about 25; and y represents the number of oxypropylene groups per molecule and is in the range of from about 1 to about 10. Examples of commercially available products are sold under the InkMaster™ and Antarox® trademarks by Rhône-Poulenc Inc.;

2) a fatty alcohol having a carbon number of from about 8 to about 22, alkoxylated with ethylene oxide and propylene oxide, as represented by formula (II):

$$R—O—(CH_2CH_2O)_x—(CH_2CH(CH_3)—O)_y—(CH_2CH_2O)_{x'}—(CH_2CH(CH_3)—O)_{y'}—Z \qquad (II);$$

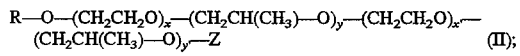

wherein R is a straight-chain or branched alkyl group having a carbon number of from about 8 to about 22; Z is H or Cl; x and x', which may be the same or different, represents the number of oxyethylene groups per molecule and is in the range of from about 2 to about 25; and y and y', which may be the same or different represents the number of oxypropylene groups per molecule and is in the range of from 0 to about 10 Examples of commercially available products are sold under the InkMaster™ trademark by Rhône-Poulenc Inc.;

3) a fatty acid having a carbon number of from about 8 to about 22, alkoxylated with ethylene oxide and propylene oxide, as represented by formula (III):

$$R—C(O)O—(CH_2CH_2O)_x—(CH_2CH(CH_3)—O)_y—Z \qquad (III);$$

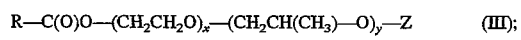

wherein R is a straight-chain or branched alkyl group having a carbon number of from about 8 to about 22; Z is H or Cl; x represents the number of oxyethylene groups per molecule and is in the range of from about 3 to about 25; and y represents the number of oxypropylene groups per molecule and is in the range of from about 2 to about 15. Examples of commercially available products are Lionsurf®, Nonatell®, Hipochem®, and Berocell® products sold respectively by Lion Industries, Inc., Shell Oil Company, High Point Chemical Corp. and EKA Nobel AB;

4) an aromatic alcohol such as phenol having alkyl chain(s) with a carbon number of from about 8 to about 20, alkoxylated with ethylene oxide, as represented by formula (IV):

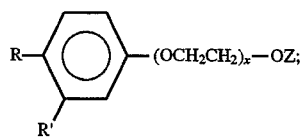
(IV)

wherein R and R' independently are H or an alkyl group which is branched or straight-chain having a carbon number of from about 8 to about 14; Z is H or Cl; and x is the number of oxyethylene groups per molecule and is in the range of from about 1 to about 20. Examples of commercially available products are InkMaster™, Igepal®, and Alkasurf®, products sold by Rhône-Poulenc Inc.;

5) fatty amide of alkanolamide of formula (V):

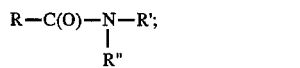
(V)

wherein R' and R" may be the same or different and are H or $CH_2CH_2OH$ or $CH_2CH(CH_3)$—OH and R is a fatty alkyl group having a carbon number of from about 8 to about 20. Examples of commercially available products are Alkamide® products sold by Rhône-Poulenc Inc.;

6) an alkoxylated fatty acid amide of alkanolamide of formula (VI):

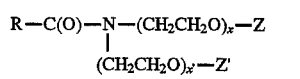
(VI)

wherein R is a fatty alkyl group having a carbon number of from about 8 to about 20; Z and Z', which may be the same or different are H or Cl; and x and x', which may be the same or different, represents the number of oxyethylene groups per molecule and is in the range of from about 2 to about 10. Examples of commercially available products are Alkamide® products sold by Rhône-Poulenc Inc.;

7) a propylene glycol alkoxylate of formula (VII):

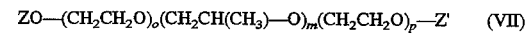
(VII)

wherein Z and Z', which may be the same or different are H or Cl; o and p are the number of oxyethylene groups per molecule and are in the range of from about 3 to about 15 and m is the number of oxypropylene groups per molecule and is in the range of from about 25 to about 40 Examples of commercially available products are Antarox® products sold by Rhône-Poulenc Inc. and products having a CTFA designation of Poloxamer;

8) a block or random copolymer of ethylene and propylene oxide of formula (VIII):

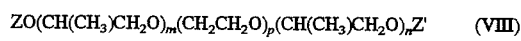
(VIII)

wherein Z and Z', which may be the same or different are H or Cl; m and n are the number of oxypropylene groups per molecule and are in the range of from about 10 to about 25 and p is the number of oxyethylene groups per molecule and is in the range of from about 5 to about 25. Examples of commercially available products are Antarox® products sold by Rhône-Poulenc Inc. and products having a CTFA designation of Meroxopol;

9) an ethoxylated fatty acid glycol and/or polyethylene glycol esters of formula (IX):

(IX)

wherein R is a fatty alkyl group of greater than $C_8$; $R^1$ is alkyl of greater than $C_8$ or H; and x represents the number of oxyethylene groups per molecule and is in the range of from about 5 to about 200. Examples of commercially available products are Alkamus® products sold by Rhône-Poulenc Inc. and products having a PEG castor oil CTFA designation; and 10) an ethoxylated fatty alcohol of formula (X):

(X)

wherein R is a fatty alkyl group; Z is H or Cl; and x represents the number of oxyethylene groups per molecule and is in the range of from about 1 to about 20 Examples of commercially available products are Rhodasurf® products sold by Rhône-Poulenc Inc.

More preferred nonionic surfactants within the above classes include:

1) Those of Formula (I) wherein R is a straight-chain or branched alkyl group having a carbon number of from about 16 to 20, Z is H, x represents the number of oxyethylene groups per molecule and is in the range of from about 10 to about 20, and y represents the number of oxypropylene groups per molecule and is in the range of from about 4 to about 8. A commercial example of such a nonionic surfactant is InkMaster™ 750; or wherein R is a straight-chain or branched alkyl group having a carbon number of from about 8 to 14, Z is H, x represents the number of oxyethylene groups per molecule and is in the range of from about 3 to about 12, and y represents the number of oxypropylene groups per molecule and is in the range of from about 1 to about 6. A commercial example of such a nonionic surfactant is Antarox® LA-EP-16, sold by Rhône-Poulenc.;

2) Those of Formula (II) wherein R is a straight-chain or branched alkyl group having a carbon number of from about 16 to about 20, Z is H, x and x' represents the number of oxyethylene groups per molecule and is in the range of from about 4 to about 10, and y and y' represents the number of oxypropylene groups per molecule and is in the range of from about 1 to about 5;

3) Those of Formula (III) wherein R is a straight-chain or branched alkyl group having a carbon number of from about 12 to about 18, Z is H, x represents the number of oxyethylene groups per molecule and is in the range of from about 3 to about 25, and y represents the number of oxypropylene groups per molecule and is in the range of from about 2 to about 15. A commercial example of such a nonionic surfactant is Hipochem® DI600, sold by High Point Chemicals;

4) Those of Formula (IV) wherein R and R' is H or a branched or straight-chain having a carbon number of from about 8 to about 14, Z is H, and x is the number of oxyethylene groups per molecule and is in the range of from about 8 to about 12. A commercial example of such a nonionic surfactant is InkMaster™ 730;

5) Those of Formula (V) wherein R' and R" are H or $CH_2CH_2OH$ or $CH_2CH(CH_3)$—OH and R is a fatty alkyl group having a carbon number of from about 8 to about 14;

6) Those of Formula (VI) wherein R is a fatty alkyl group having a carbon number of from about 8 to about 14, Z is H, and x and x' represents the number of oxyethylene groups per molecule and is in the range of from about 4 to about 8;

7) Those of Formula (IX) wherein R is a fatty alkyl group of greater than $C_8$; $R^1$ is alkyl of greater than $C_8$ or H; and x represents the number of oxyethylene groups per molecule and is in the range of from about 8 to about 30; and 8) Those of Formula (X) wherein R is a fatty alkyl group having a carbon number from about 12 to about 18, Z is H, and x represents the number of oxyethylene groups per molecule and is in the range of from about 5 to about 15. A commercial example of such a nonionic surfactant is Rhodasurf® BC720, sold by Rhône-Poulenc Inc.;

Of the above, the use of the following classes of nonionic surfactants is particularly suggested: those of Formula (I), (II), (IX) as defined above.

Other nonionic surfactants include alkyl polyglycosides, N-octyl pyrollidones and ethoxylated tristyrylphenols.

The amount of surfactant present in the aqueous medium of the pulper ranges from about 0.05 to about 3.0 percent by weight based upon the dry weight of all paper added to the pulper, with amounts ranging from about 0.1 to about 0.5 percent being more preferred and amounts ranging from about 0.2 to about 0.4 percent being even more preferred Also present in the aqueous medium of the pulper is one or more anionic polyelectrolytes. Such materials are characterized by being anionic in nature and function to reduce redeposition of the carbon black pigment to the pulp fibers.

Polyelectrolytes found to be particularly effective in this application include the copolymers of maleic anhydride and isobutylene, preferably those having a molecular weight of about 40,000.

Other anionic polyelectrolytes which are recommended include polyacrylic acid, preferably having a molecular weight of about 5,000, and the formaldehyde condensate of methylnapthalene sulfonic acid, preferably having a molecular weight of about 300 to about 4,000.

Other anionic polyelectrolytes which may be selected include polymers containing 2-acrylamidopropane sulfonic acid, polysaccharides, polyesters, hydrolyzed polyacrylamides, methacrylic acid, itaconic acid, and similar vinylic compounds with anionic functional groups, as well as condensation polymers containing anionic functional groups, and naturally occurring polymers containing such functionality, either naturally, or through chemical modification. Choice of the most preferred product may depend on local economic conditions and processing details that vary depending on specific applications.

The amount of anionic polyelectrolyte present in the aqueous medium is between about 0.01 to about 2.0 percent by weight of the dry weight of all paper stock in the pulper.

Also present during the pulping step is an amount of paper which is different from that being processed and contains inorganic fillers, coatings or mixtures thereof. Particularly preferred is the use of coated magazine stock, or filled stock wherein the filler material is an inorganic material such as $CaCO_3$, $TiO_2$, clay materials, and the like. The ink present on the coated or filled stock may be either hydrophobic or hydrophilic, the key criteria being that the added stock have a coating and/or inorganic filler material.

The amount of added coated and/or filled stock is between about 10 to about 50 percent by weight of all paper material added to the pulper. More preferred is the use of between about 10 to about 50 percent by weight of all paper material added to the pulper, and even most preferred is the use of between about 10 to about 50 percent by weight of all paper material added to the pulper.

Optionally present in the aqueous medium of the pulper are commonly known deinking additives added in amounts recognized by those skilled in the art. Such additives include, but are not limited to bleaches, sodium silicate, chelants, sequestrants, dispersants other than the defined nonionic surfactant, coagulants, detergent builders, other detergents and the like. In addition, the pulper may also include an amount of newsprint printed with a hydrophobic ink. The amount of such newsprint may range from about 10 to about 90 percent by weight of the total amount of paper added, more preferably between about 10 and about 50 percent.

It is important to maintain an appropriate pulp slurry temperature during pulping. Determining the appropriate temperature range is within the skill of an artisan. Generally the range is from about 30° C. to about 65° C., preferably from about 35° C. to about 60° C. and most preferably from about 40° C. to about 55° C.

The activation period is the time needed to allow substantially all of the paper in the pulp slurry to come into contact with the aqueous medium and become defibered by mechanical action of the pulper. Conditions such as the degree of dilution of the pulp slurry and the utilization of agitation can effect the amount of time needed. The determination of the appropriate amount of time needed is within the skill of an artisan. Generally, this time period can range from about 5 to about 90, preferably from about 10 to about 60 and most preferably from about 15 to about 30 minutes.

Once the paper added to the pulper has been sufficiently slurried in the aqueous medium, the slurry is transferred to a flotation cell which is maintained at an alkaline pH and includes both the one or more nonionic surfactants and one or more anionic polyelectrolytes.

The pH of the flotation cell is maintained between about 8 to about 10.5, more preferably between about 8.5 to about 9.5, and most preferably between about 9 to about 9.5. This pH often is the pH of the slurry which is provided to the flotation cell. If necessary to provide the desired pH profile, one or more of the basic agents which have been described in connection with the pulping step may be added in amounts to yield a pH in the flotation cell as defined above.

Also present in the flotation cell is one or more nonionic surfactants as defined above with respect to the pulping step. The amount of nonionic surfactant present is that which yields the same percentages as that present in the pulping step (i.e., between about 0.05 to about 3.0 percent by weight of the paper added to the pulper). Often it is not necessary to add additional nonionic surfactant as that which is present in the slurry produced in the pulper is sufficient for functioning in the flotation cell, although additional nonionic surfactant may be added.

Also present in the flotation cell is one or more anionic polyelectrolytes as defined above with respect to the pulping step. The amount of anionic polyelectrolyte present is that which yields the same percentages as that present in the pulping step (i.e., about 0.01 to about 2.0 percent by weight of the dry weight of all paper stock). The polyelectrolyte may, as a matter of fact, be identical to that which is present as the binder to the hydrophilic ink. Often it is not necessary to add additional polyelectrolyte as that which is present in the slurry produced in the pulper is sufficient for functioning in the flotation cell, although additional anionic polyelectrolyte may be added.

Other materials which may be added to the flotation cell, which are considered optional, include foam enhancing chemicals, pH adjusting chemicals, bleaches, chelants, clarification aids (e.g., cationic polymers) and mixtures thereof.

The slurry is maintained in the flotation cell for a time, temperature and rate of agitation necessary to produce a foam which contains a significant amount of the removed ink. Such process conditions are preferably those operating conditions which are defined by the manufacturer of the flotation cell. Such conditions typically comprise treating the slurry at about 40° C. to about 50° C. for about 1 to about 30 minutes, injecting air into the cell in an amount sufficient to disperse air bubbles throughout the mixture, with good agitation and without becoming so turbulent as to dislodge ink from the air bubbles. This amount of injection is typically about 1 cell volume of air per minute. The concentration of the paper fibers is about 0.5 to about 2.0% of the cell.

Once flotation has been completed, the foam which forms above the slurry in the flotation is removed by methods known in the art such as by a scraper. From the remaining slurry, paper can be produced which has a high level of brightness.

Alternatively, the remaining slurry may be subjected to additional processing steps such as post flotation wash procedures as would be recognized by those skilled in the art to yield even more superior paper products.

The invention is described in greater detail by the following non-limiting examples.

COMPARATIVE EXAMPLES 1–8

Pulping Step: Repulping of a series of recycle paper samples is performed. All experiments are conducted starting with 45° C. tap water. Pulping of the paper samples is accomplished by using a KitchenAid K5SS mixer having an anchor shaped beater and a Waring 7011 31BC92 blender. Magazine components of the recycle furnish are treated by addition to the blender along with 800 parts water and are pulped for 3 minutes at the low speed setting. The resulting slurry is then added to the KitchenAid mixer along with the news component of the furnish. 100 parts of water containing the treatment chemicals are added to the pulper. Pulping is conducted at a speed setting of 1 until the large lumps of paper are broken up (less than one minute), and then at a speed setting of 4 for the remainder of the pulping process (total 20 minutes).

Sampling After Pulping and Before Flotation Step: A 25 part sample of the resulting pulp is then diluted into 500 parts of cold tap water and mixed until homogeneous. This mixture is used to form a handsheet according to TAPPI standard method 204 in a British Standard Handsheet mold. The handsheet is allowed to dry overnight. The resulting handsheet is analyzed for optical reflectance using a Technidyne Handibright calibrated using white and yellow ceramic standards supplied by the equipment manufacturer.

Flotation Step: A 625 part sample of the pulp slurry is added to a Denver Laboratory 5 liter float cell. 4375 parts of 45° C. tap water are added to the float cell. Additional flotation aids are added to the float cell at this time. The Denver mixer is used at 2100 RPM to mix the cell for 3 minutes, and thereafter the air injection valve is opened. A needle valve and rotameter are used to control the air flow rate at 3 l/min. Foam created by the injection of air is allowed to accumulate to about 0.5–1" thickness, and then is scraped off the top of the cell with a spatula into a container. After 3 minutes of floatation the air flow is turned off; and about 100–400 parts of reject foam, water, fiber and ink are collected using this method. 250 ml of the float cell accepts are diluted with an additional 250 parts of cold tap water. A handsheet from this material is produced by using the above method, and is dried and evaluated for optical reflectance.

Post Flotation Washing Step: A final wash step is conducted by providing a 300 ml sample of float cell accepts and adding it to a Britt Dynamic Drainage jar fitted with an 80 mesh screen which is mixed at 1000 rpm. The jar is allowed to drain freely, and 300 parts of 50° C. tap water are added to the jar; the fiber mat on the screen is resuspended by agitation at 1000 rpm, and is allowed to drain a second time. The resulting mat is suspended into cold tap water and formed into a handsheet by the above procedure. The handsheet is allowed to dry overnight and the optical reflectance of the handsheet is then measured.

A series of experiments are performed to evaluate the impact of a polyelectrolyte and recycle furnish types on the removal of waterborne pigment from secondary fiber. The amounts and types of recycle furnish type are shown in the following table.

A total of 100 parts by weight of ink containing stock is used for each experiment. The ink containing stock includes a mixture of magazine (i.e., coated) stock, stock containing hydrophilic ink (i.e., Flexo Content) as listed by amounts in the attached table, with the balance of the remaining 100 parts comprising conventional, hydrophobic ink newsprint stock.

| Comp. Example | Magazine Content (parts) | Flexo Content (parts) | Conventional Content (parts) | Polyelectrolyte (parts) | Brightness (pulp) | Brightness (float) | Brightness (float/wash) |
| --- | --- | --- | --- | --- | --- | --- | --- |
| 1 | 0 | 0 | 100 | 0 | 52.1 | 54.3 | 54.6 |
| 2 | 0 | 0 | 100 | 0.2 | 48.2 | 51.2 | 52.1 |
| 3 | 0 | 20 | 80 | 0 | 47.7 | 48.7 | 48.4 |
| 4 | 0 | 20 | 80 | 0.2 | 46.0 | 46.2 | 47.6 |

-continued

| Comp. Example | Magazine Content (parts) | Flexo Content (parts) | Conventional Content (parts) | Polyelectrolyte (parts) | Brightness (pulp) | Brightness (float) | Brightness (float/wash) |
|---|---|---|---|---|---|---|---|
| 5 | 30 | 0 | 70 | 0 | 49.5 | 56.6 | 56.4 |
| 6 | 30 | 0 | 70 | 0.2 | 50.2 | 52.6 | 52.5 |
| 7 | 30 | 20 | 50 | 0 | 45.5 | 47.9 | 49.0 |
| 8 | 30 | 20 | 50 | 0.2 | 47.1 | 48.0 | 49.3 |

In each of these experiments conditions commonly known as 'alkaline soap' are used. Pulper chemicals that are used are 0.4 parts of flaked soap (Ivory Snow; includes anionic surfactants), 2 parts 50% NaOH, 2 parts $H_2O_2$, and 3 grams PQ Corporation Type N silicate, a 41° Baumé 3.22 Na2O/SiO2 silicate solution. Float chemical additives are 0.2 parts of the soap, and 20.8 grams of a 10% solution of $CaCl_2$. Pulper pH is about 9.5 and float cell pH is about 9.0. The polyelectrolyte used is a copolymer of maleic anhydride and isobutylene with a molecular weight of about 40,000.

Under these conditions it is apparent that the addition of dispersant is deleterious to the brightness of the product paper, except in the comparison between experiments 7 and 8, where a small increase was observed. The resulting brightness is still far short of that achieved when no waterborne pigment is present in the pulp. This series of experiments demonstrates that anionic surfactants do not appreciably assist in the treatment of waterborne inks.

COMPARATIVE EXAMPLES 9–15, EXAMPLE 16

A series of eight experiments identical to those described with respect to Comparative Examples 1–8 are performed to evaluate the impact of a polyelectrolyte and recycle furnish types on the removal of waterborne pigment from secondary fiber.

| Comparative or Inventive Example | Magazine Content, parts | Flexo Content, parts | Conventional Content, parts | Polyelectrolyte parts | Brightness (pulp) | Brightness (float) | Brightness (float/wash) |
|---|---|---|---|---|---|---|---|
| 9 | 0 | 0 | 100 | 0 | 45.4 | 49.2 | 52.5 |
| 10 | 0 | 0 | 100 | 0.2 | 48.2 | 49.7 | 53.6 |
| 11 | 0 | 20 | 80 | 0 | 44.7 | 48.2 | 49 |
| 12 | 0 | 20 | 80 | 0.2 | 46.1 | 48.4 | 50.1 |
| 13 | 30 | 0 | 70 | 0 | 48.8 | 51.6 | 53.4 |
| 14 | 30 | 0 | 70 | 0.2 | 50.6 | 52.4 | 56.4 |
| 15 | 30 | 20 | 50 | 0 | 46.7 | 51.4 | 53.9 |
| 16 | 30 | 20 | 50 | 0.2 | 50.0 | 53.7 | 55.3 |

In each of these experiments a nonionic surfactant is used, an ethoxylated-propoxylated alkyl alcohol (InkMaster™ 750 from Rhône-Poulenc Inc.). Pulper chemicals used are 0.2 parts of surfactant, 2 parts 50% NaOH, 2 parts $H_2O_2$, and 3 parts PQ Corporation Type N silicate, a 41° Baumé 3.22 Na2O/SiO2 silicate solution. The float chemical additives are 0.1 part of the same surfactant. Pulper pH is about 9.5 and float cell pH about 9.0. The polyelectrolyte is a copolymer of maleic anhydride and isobutylene having a molecular weight of about 40,000.

In this series of experiments it is apparent that the addition of polyelectrolyte is generally favorable to the brightness of the final pulp; in addition, a comparison between experiments 10 and 12 vs. 14 and 16 shows that the presence of magazine also assists in reducing the negative impact of the presence of waterborne pigment. Finally, it is clear from the much higher brightness result of Example 16 vs. Comparative Example 8, and the actual brightness levels achieved that the combination of magazine, nonionic surfactant and polyelectrolyte is synergistic in some fashion, essentially eliminating the negative effects of waterborne pigments on pulp brightness.

Having described the invention in detail and by reference to the preferred embodiments thereof, it will be apparent that modifications and variations are possible without departing from the scope of the appended claims.

What is claimed is:

1. A process for removing waterborne flexographic inks from paper stock comprising the steps of:
   (a) forming a slurry by pulping paper containing waterborne flexographic inks in an aqueous medium having a pH of greater than 8 which includes:
      (1) one or more basic agents;
      (2) one or more nonionic surfactants;
      (3) one or more anionic polyelectrolytes; and
      (4) an amount of paper different from that being processed which contains inorganic fillers, coatings or mixtures thereof; and
   (b) subjecting the slurry produced in step (a) to a flotation cell having an aqueous medium having a pH of greater than 8 which includes:
      (1) one or more basic agents;
      (2) one or more nonionic surfactants; and
      (3) one or more anionic polyelectrolytes.

2. The process according to claim 1 wherein the pH of said aqueous medium of step (a) is between about 8 to about 10.5.

3. The process according to claim 2 wherein the pH of said aqueous medium of step (a) is between about 9 to about 10.

4. The process according to claim 3 wherein the pH of said aqueous medium of step (a) is between about 9 to about 9.5.

5. The process according to claim 1 wherein said at least one basic agent of said aqueous medium of step (a) is selected from the group consisting of NaOH, $NH_4OH$, KOH, $Na_2CO_3$, $K_2CO_3$, silicates, $Na_3PO_4$, $Na_2HPO_4$ and mixtures thereof.

6. The process according to claim 1 wherein said at least one nonionic surfactant of said aqueous medium of step (a) is selected from the group consisting of 1) a fatty alcohol having a carbon number of from about 8 to about 22, alkoxylated with ethylene oxide and propylene oxide, as represented by formula (I)

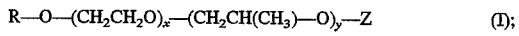

wherein R is a straight-chain or branched alkyl group having a carbon number of from about 8 to 22; Z is H or Cl; x represents the number of oxyethylene groups per molecule and is in the range of from about 3 to about 25; and y represents the number of oxypropylene groups per molecule and is in the range of from about 1 to about 10;

2) a fatty alcohol having a carbon number of from about 8 to about 22, alkoxylated with ethylene oxide and propylene oxide, as represented by formula (II):

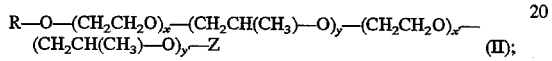

wherein R is a straight-chain or branched alkyl group having a carbon number of from about 8 to about 22; Z is H or Cl; x and x', which may be the same or different, represents the number of oxyethylene groups per molecule and is in the range of from about 2 to about 25; and y and y', which may be the same or different represents the number of oxypropylene groups per molecule and is in the range of from 0 to about 10;

3) a fatty acid having a carbon number of from about 8 to about 22, alkoxylated with ethylene oxide and propylene oxide, as represented by formula (III):

wherein R is a straight-chain or branched alkyl group having a carbon number of from about 8 to about 22; Z is H or Cl; x represents the number of oxyethylene groups per molecule and is in the range of from about 3 to about 25; and y represents the number of oxypropylene groups per molecule and is in the range of from about 2 to about 15;

4) an aromatic alcohol having alkyl chain(s) with a carbon number of from about 8 to about 20, alkoxylated with ethylene oxide, as represented by formula (IV):

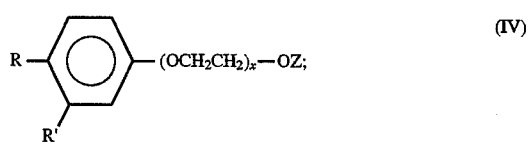

wherein R and R' independently are H or an alkyl group which is branched or straight-chain having a carbon number of from about 8 to about 14; Z is H or Cl; and x is the number of oxyethylene groups per molecule and is in the range of from about 1 to about 20;

5) fatty amide of alkanolamide of formula (V):

wherein R' and R" may be the same or different and are H or $CH_2CH_2OH$ or $CH_2CH(CH_3)$—OH and R is a fatty alkyl group having a carbon number of from about 8 to about 20;

6) an alkoxylated fatty acid amide of alkanolamide of formula (VI):

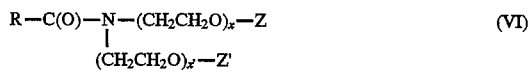

wherein R is a fatty alkyl group having a carbon number of from about 8 to about 20; Z and Z', which may be the same or different are H or Cl; and x and x', which may be the same or different, represents the number of oxyethylene groups per molecule and is in the range of from about 2 to about 10;

7) a propylene glycol alkoxylate of formula (VII):

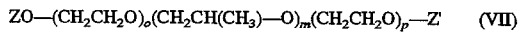

wherein Z and Z', which may be the same or different are H or Cl; o and p are the number of oxyethylene groups per molecule and are in the range of from about 3 to about 15 and m is the number of oxypropylene groups per molecule and is in the range of from about 25 to about 40;

8) a block or random copolymer of ethylene and propylene oxide of formula (VIII):

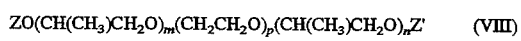

wherein Z and Z', which may be the same or different are H or Cl; m and n are the number of oxypropylene groups per molecule and are in the range of from about 10 to about 25 and p is the number of oxyethylene groups per molecule and is in the range of from about 5 to about 25;

9) an ethoxylated fatty acid glycol and/or polyethylene glycol esters of formula (IX):

wherein R is a fatty alkyl group of greater than $C_8$; $R^1$ is alkyl of greater than $C_8$ or H; and x represents the number of oxyethylene groups per molecule and is in the range of from about 5 to about 200; and 10) an ethoxylated fatty alcohol of formula (X):

wherein R is a fatty alkyl group; Z is H or Cl; and x represents the number of oxyethylene groups per molecule and is in the range of from about 1 to about 20.

7. The process according to claim 6 wherein said at least one nonionic surfactant of said aqueous medium of step (a) is selected from the group consisting of a) a fatty alcohol having a carbon number of from about 8 to about 22 alkoxylated with ethylene oxide and propylene oxide, as defined by the formula

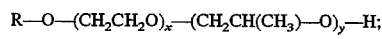

wherein R is a straight-chain or branched alkyl group having a carbon number of from about 8 to about 22, x represents the number of oxyethylene groups per molecule and is in the range of from about 3 to about 25, and y represents the number of oxypropylene groups per molecule and is in the range of from about 2 to about 10;

b) a fatty alcohol having a carbon number of from about 8 to about 22 alkoxylated with ethylene oxide and propylene oxide, as defined by the formula:

$$R-O-(CH_2CH_2O)_x-(CH_2CH(CH_3)-O)_y-(CH_2CH_2O)_{x'}-(CH_2CH(CH_3)-O)_{y'}-H;$$

wherein R is a straight-chain or branched alkyl group having a carbon number of from about 8 to about 22, x and x' may be the same or different and represents the number of oxyethylene groups per molecule and is in the range of from about 2 to about 25, and y and y' may be the same or different and represents the number of oxypropylene groups per molecule and is in the range of from 0 to about 10; and c) an ethoxylated fatty acid, glycol or polyethylene glycol ester of the formula:

$$R-C(O)O-(CH_2CH_2O)_x-R_1$$

wherein R is a fatty alcohol greater than $C_8$, $R_1$ is an alkyl of greater than $C_8$ or H, and x represents the number of oxyethylene groups per molecule and is in the range of from about 5 to about 200.

8. The process according to claim 6 wherein said at least one nonionic surfactant of step (a) present in step (a) in a total amount of about 0.05 to about 1.0 percent by weight of the dry weight of all paper stock in step (a).

9. The process according to claim 6 wherein said at least one anionic polyelectrolyte of step (a) is present in step (a) in a total amount of about 0.01 to about 2.0 percent by weight of the dry weight of all paper stock in step (a).

10. The process according to claim 1 wherein said one or more anionic polyelectrolytes in step (a) is selected from the group consisting of copolymers of maleic anhydride and isobutylene, polyacrylic acid and its acid salts, the formaldehyde condensate of methylnapthalene sulfonic acid, polymers containing 2-acrylamidopropane sulfonic acid, methacrylic acid, itaconic acid, vinylic compounds with anionic functional groups, condensation polymers containing anionic functional groups, naturally occurring polymers containing anionic functionality and mixtures thereof.

11. The process according to claim 10 wherein said one or more anionic polyelectrolytes in step (a) comprise a copolymer of maleic anhydride and isobutylene.

12. The process according to claim 1 wherein said paper different from that being processed in step (a) is selected from the group consisting of coated magazine stock, stock with inorganic filler material, and mixtures thereof.

13. The process according to claim 12 wherein said paper different from that being processed in step (a) is present in an amount of about 10.0 to about 50.0 percent by weight of the dry weight of all paper stock in step (a).

14. The process according to claim 1 wherein said aqueous medium of step (a) further includes additional materials selected from the group consisting of bleaches, sodium silicate, dispersants, coagulants, detergent builders, conventional deinking additives and mixtures thereof.

15. The process according to claim 1 wherein the stock in step (a) further includes stock containing flexographic hydrophobic printing ink.

16. The process according to claim 1 wherein the pH of said aqueous medium of step (b) is between about 8 to about 10.5.

17. The process according to claim 16 wherein the pH of said aqueous medium of step (b) is between about 8.5 to about 9.5.

18. The process according to claim 17 wherein the pH of said aqueous medium of step (b) is between about 9 to about 9.5.

19. The process according to claim 1 wherein said at least one basic agent of said aqueous medium of step (b) is selected from the group consisting of NaOH, $NH_4OH$, KOH, $Na_2CO_3$, $K_2CO_3$, silicates, $Na_3PO_4$, $Na_2HPO_4$ and mixtures thereof.

20. The process according to claim 1 wherein said at least one nonionic surfactant of said aqueous medium of step (b) is selected from the group consisting of 1) a fatty alcohol having a carbon number of from about 8 to about 22, alkoxylated with ethylene oxide and propylene oxide, as represented by formula (I)

$$R-O-(CH_2CH_2O)_x-(CH_2CH(CH_3)-O)_y-Z \quad (I);$$

wherein R is a straight-chain or branched alkyl group having a carbon number of from about 8 to 22; Z is H or Cl; x represents the number of oxyethylene groups per molecule and is in the range of from about 3 to about 25; and y represents the number of oxypropylene groups per molecule and is in the range of from about 1 to about 10;

2) a fatty alcohol having a carbon number of from about 8 to about 22, alkoxylated with ethylene oxide and propylene oxide, as represented by formula (II):

$$R-O-(CH_2CH_2O)_x-(CH_2CH(CH_3)-O)_y-(CH_2CH_2O)_{x'}-(CH_2CH(CH_3)-O)_{y'}-Z \quad (II);$$

wherein R is a straight-chain or branched alkyl group having a carbon number of from about 8 to about 22; Z is H or Cl; x and x', which may be the same or different, represents the number of oxyethylene groups per molecule and is in the range of from about 2 to about 25; and y and y', which may be the same or different represents the number of oxypropylene groups per molecule and is in the range of from 0 to about 10;

3) a fatty acid having a carbon number of from about 8 to about 22, alkoxylated with ethylene oxide and propylene oxide, as represented by formula (III):

$$R-C(O)O-(CH_2CH_2O)_x-(CH_2CH(CH_3)-O)_y-Z \quad (III);$$

wherein R is a straight-chain or branched alkyl group having a carbon number of from about 8 to about 22; Z is H or Cl; x represents the number of oxyethylene groups per molecule and is in the range of from about 3 to about 25; and y represents the number of oxypropylene groups per molecule and is in the range of from about 2 to about 15;

4) an aromatic alcohol having alkyl chain(s) with a carbon number of from about 8 to about 20, alkoxylated with ethylene oxide, as represented by formula (IV):

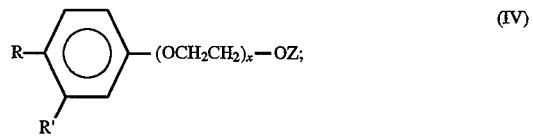

wherein R and R' independently are H or an alkyl group which is branched or straight-chain having a carbon number of from about 8 to about 14; Z is H or Cl; and x is the number of oxyethylene groups per molecule and is in the range of from about 1 to about 20;

5) fatty amide of alkanolamide of formula (V):

$$R-C(O)-N(R')-R'' \quad (V)$$

wherein R' and R'' may be the same or different and are H or $CH_2CH_2OH$ or $CH_2CH(CH_3)-OH$ and R is a fatty alkyl group having a carbon number of from about 8 to about 20;

6) an alkoxylated fatty acid amide of alkanolamide of formula (VI):

$$R-C(O)-N((CH_2CH_2O)_{x'}-Z')-(CH_2CH_2O)_x-Z \quad (VI)$$

wherein R is a fatty alkyl group having a carbon number of from about 8 to about 20; Z and Z', which may be the same or different are H or Cl; and x and x', which may be the same or different, represents the number of oxyethylene groups per molecule and is in the range of from about 2 to about 10;

7) a propylene glycol alkoxylate of formula (VII):

$$ZO-(CH_2CH_2O)_o(CH_2CH(CH_3)-O)_m(CH_2CH_2O)_p-Z' \quad (VII)$$

wherein Z and Z', which may be the same or different are H or Cl; o and p are the number of oxyethylene groups per molecule and are in the range of from about 3 to about 15 and m is the number of oxypropylene groups per molecule and is in the range of from about 25 to about 40;

8) a block or random copolymer of ethylene and propylene oxide of formula (VIII):

$$ZO(CH(CH_3)CH_2O)_m(CH_2CH_2O)_p(CH(CH_3)CH_2O)_n Z' \quad (VIII)$$

wherein Z and Z', which may be the same or different are H or Cl; m and n are the number of oxypropylene groups per molecule and are in the range of from about 10 to about 25 and p is the number of oxyethylene groups per molecule and is in the range of from about 5 to about 25;

9) an ethoxylated fatty acid glycol and/or polyethylene glycol esters of formula (IX):

$$R-C(O)O-(CH_2CH_2O)_x-R^1 \quad (IX)$$

wherein R is a fatty alkyl group of greater than $C_8$; $R^1$ is alkyl of greater than $C_8$ or H; and x represents the number of oxyethylene groups per molecule and is in the range of from about 5 to about 200; and 10) an ethoxylated fatty alcohol of formula (X):

$$RO(CH_2CH_2O)_x-Z \quad (X)$$

wherein R is a fatty alkyl group; Z is H or Cl; and x represents the number of oxyethylene groups per molecule and is in the range of from about 1 to about 20.

21. The process according to claim 20 wherein said at least one nonionic surfactant of said aqueous medium of step (b) is selected from the group consisting of a) a fatty alcohol having a carbon number of from about 8 to about 22 alkoxylated with ethylene oxide and propylene oxide, as defined by the formula $$R-O-(CH_2CH_2O)_x-(CH_2CH(CH_3)-O)_y-H;$$

wherein R is a straight-chain or branched alkyl group having a carbon number of from about 8 to about 22, x represents the number of oxyethylene groups per molecule and is in the range of from about 3 to about 25, and y represents the number of oxypropylene groups per molecule and is in the range of from about 2 to about 10;

b) a fatty alcohol having a carbon number of from about 8 to about 22 alkoxylated with ethylene oxide and propylene oxide, as defined by the formula:

$$R-O-(CH_2CH_2O)_x-(CH_2CH(CH_3)-O)_y-(CH_2CH_2O)_{x'}-(CH_2CH(CH_3)-O)_{y'}-H;$$

wherein R is a straight-chain or branched alkyl group having a carbon number of from about 8 to about 22, x and x' may be the same or different and represents the number of oxyethylene groups per molecule and is in the range of from about 2 to about 25, and y and y' may be the same or different and represents the number of oxypropylene groups per molecule and is in the range of from 0 to about 10; and c) an ethoxylated fatty acid, glycol or polyethylene glycol ester of the formula:

$$R-C(O)O-(CH_2CH_2O)_x-R_1$$

wherein R is a fatty alcohol greater than $C_8$, $R_1$ is an alkyl of greater than $C_8$ or H, and x represents the number of oxyethylene groups per molecule and is in the range of from about 5 to about 200.

22. The process according to claim 1 wherein said one or more anionic polyelectrolytes in step (b), is selected from the group consisting of copolymers of maleic anhydride and isobutylene, polyacrylic acid and its acid salts, the formaldehyde condensate of methylnapthalene sulfonic acid, polymers containing 2-acrylamidopropane sulfonic acid, methacrylic acid, itaconic acid, vinylic compounds with anionic functional groups, condensation polymers containing anionic functional groups, naturally occurring polymers containing anionic functionality and mixtures thereof.

23. The process according to claim 22 wherein said one or more anionic polyelectrolytes in step (b) comprise a copolymer of maleic anhydride and isobutylene.

24. The process according to claim 1 wherein said one or more nonionic surfactants and said one or more anionic polyelectrolytes in step (b) are obtained from the resulting product of step (a).

25. The process according to claim 1 comprising the additional step of:

(c) removing any foam produced in step (b) from the flotation cell.

26. The process according to claim 1 wherein said aqueous medium of step (b) further includes additional materials selected from the group consisting of foam enhancing chemicals, pH adjusting chemicals, bleaches, chelants, clarification aids and mixtures thereof.

* * * * *